Aug. 6, 1963     R. F. NELSON     3,099,864
RAILWAY CAR DOOR OPERATING LEVER SAFETY STRUCTURE
Filed July 1, 1960
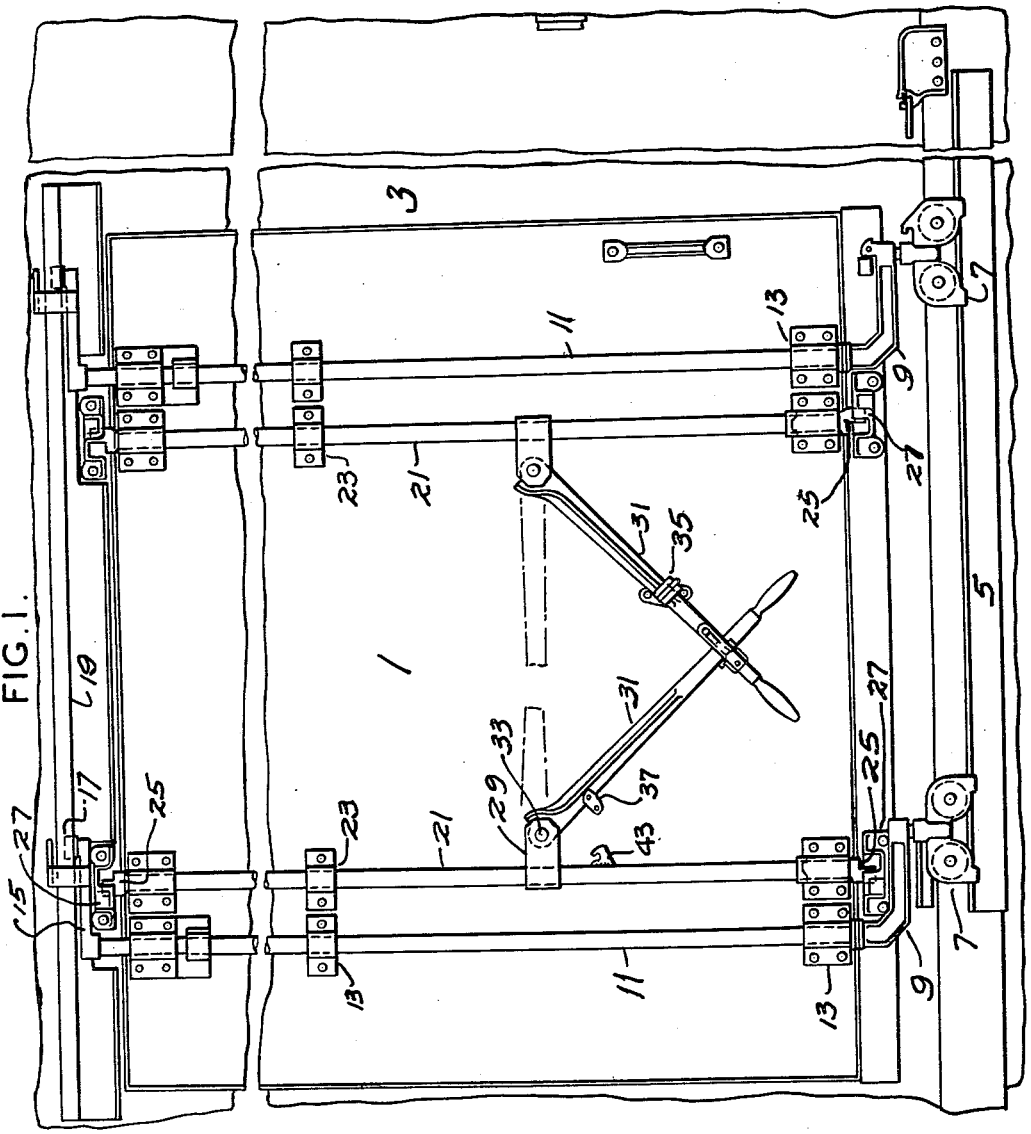
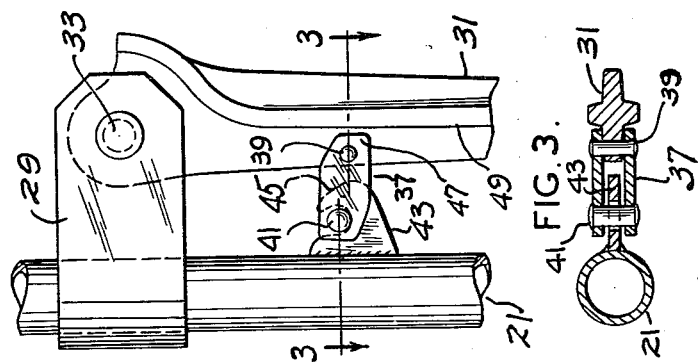
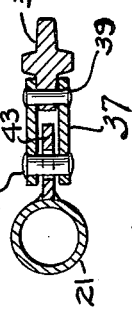
Inventor
Reuben F. Nelson
By Rodney Bedell
atty.

United States Patent Office 3,099,864
Patented Aug. 6, 1963

3,099,864
RAILWAY CAR DOOR OPERATING LEVER
SAFETY STRUCTURE
Reuben F. Nelson, Roseville, Calif., assignor, by mesne assignments, to American Seal-Kap Corporation of Delaware, New York, N.Y., a corporation of Delaware
Filed July 1, 1960, Ser. No. 40,335
2 Claims. (Cl. 20—23)

The invention relates to operating mechanism for railway car doors and more particularly to a safety device for securing a pivoted lever handle against accidental swinging movement away from an operating shaft on which it is pivoted to a lateral extended position in which it may injure a nearby workman or strike a truck, platform, or other structure near the car.

One form of railway car door mounting involves an elongated track alongside the door opening, a door movable along said track and having an upright operating or locking shaft with a crank-like extension at one or both ends disposed to engage a fixed element on the car side such as a keeper or carriage stop. The shaft is manually rotated to move the door transversely of the car wall in and out of the door opening or to lock the door in the opening by a lever pivoted on the shaft to swing from an inoperative position alongside the shaft to an operating position in which it extends substantially radially of the shaft. If the door is open and is moved quickly along the track toward closed position, either by a workman or by accelerated movement of the car, the shaft crank extension may strike the fixed element on the car side and cause the shaft to rotate suddenly resulting in centrifugal force acting upon the lever and handle and causing the latter to swing upwardly and circumferentially about the shaft axis to hit whatever may be in its path and cause injury or damage. The object of the present invention is to avoid such accidental movement of the lever.

In the accompanying drawings showing a selected embodiment of the invention:

FIGURE 1 is an elevation of a railway refrigerator car side, broken away in part, with a door movable laterally into and out of the door opening and then lengthwise of the car side to and from a fully open position. FIGURE 1 shows the door operating mechanism in position when the door is closed and locked and the car is ready for transit.

FIGURE 2 is a detail of one of the shafts shown in FIGURE 1 with its operating lever substantially vertical and alongside of the shaft and latched to the latter. This is the position assumed when the door is open.

FIGURE 3 is a detail horizontal section on line 3—3 of FIGURE 1.

The door 1 is applied to the car side 3 in a well known manner, being supported from a track 5 by wheeled carriages 7 supporting the crank arms 9 each fixed on a mounting shaft 11 which is journaled on the door by bearings 13. Crank arms 15 at the upper ends of shafts 11 carry rollers 17 engaging a retainer 19 extending above the door opening.

Upright locking shafts 21 are journaled on the door in bearings 23 and each shaft has at its upper and lower ends offset crank cams or locks 25 disposed to be engaged with keepers 27, fixed on the car side, when the door is opposite the door opening. Rotation of shafts 21 will rotate the cam locks 25 in the keepers to force the door inwardly of the door opening and hold it in closed position until shafts 21 are positively rotated in the opposite direction to release the locks.

The shafts are rotated by levers each comprising a bracket 29 fixed to the shaft and an elongated handle 31 having a horizontal pivot 33 on the bracket and movable about its pivot from a radial position (indicated in broken lines in FIGURE 1) to a locking position (indicated in full lines in FIGURE 1), and to a depending inoperative position (as shown in FIGURE 2). When the handles are in the full line position shown in FIGURE 1, the right hand handle overlies the left hand handle and rests in a holder 35 secured to the door. This avoids accidental rotation of shafts 21. When the handles are swung up from the interlocked position and about the shaft axes to rotate the shafts 90° or more and then released, they hang vertically from their pivots 33 as shown in FIGURE 2. When moved toward dependent position a double link 37 having a horizontal pivot 39 on handle 31 and a transverse pin 41 on its swinging end is opposed to an upwardly opening hook 43 on shaft 21 and pin 41 rides up the upwardly inclined outer face 45 of the hook and drops into the hook to secure the handle against accidental swinging upwardly and outwardly from the position shown.

The pivoted end of the hook has a shoulder 47 opposing a rib 49 on the handle to hold the link substantially horizontal so that its pin will engage face 45 as the handle swings toward the shaft.

This arrangement permits the automatic latching of the lever to the shaft when the levers are removed from the locking position shown in FIGURE 1 and allowed to drop down due to the weight of the lever. Subsequent movement of the door along the track and engagement of a crank cam 25 with a keeper 27, and resulting sudden rotation of the shaft, cannot cause the handle to swing out and up. The link must be unlatched manually to free the lever, and this attains the general objectives set forth in the introductory portion of the specification.

It will be understood that the safety device may be applied to more than one operating lever handle and that the details of the device may be varied substantially from what is shown without departing from the spirit of the invention and the exclusive use of the modifications coming within the scope of the claims is contemplated.

I claim:

1. In combination, a railway car side wall, an elongated horizontal track carried thereby parallel to the wall, a door movable along said track between open and closed positions, an upright shaft journaled on said door and having a crank arm with a locking cam at its swinging end, a fixed keeper on the side wall engageable by said cam as the door moves from open position toward closed position, an operating lever including a handle having a horizontal pivot on said shaft and movable about its pivot from a depending position alongside said shaft to a position extending laterally therefrom, a link-like latch having a horizontal pivot on said handle at a point spaced from the latter's pivot on the shaft, and a hook on the shaft engageable by said latch by gravity as the lever moves to said depending position to hold the lever against accidental reverse movement from said depending position due to rotation of the shaft by the engagement of the keeper by the locking cam.

2. In combination, a railway car door, an upright shaft journaled thereon and having a horizontal crank arm at its end provided with a pin substantially parallel to the shaft and arranged to engage a fixed element on a car side to limit movement of the door, a lever including a handle with a horizontal pivot on said shaft and swinging in a vertical plane between positions parallel to the shaft and extending laterally from the shaft respectively but fixed against movement relative to the shaft about the shaft axis, and a securing device consisting of two latch parts mounted on said lever handle and shaft respectively, automatically holding the handle, when dropped to vertical position and irrespective of the angular position of the shaft, against movement upwardly by centrifugal force about its horizontal pivot on the shaft upwardly and outwardly from said parallel position when said crank engages said fixed element.

References Cited in the file of this patent

UNITED STATES PATENTS

| | | |
|---|---|---|
| 1,841,573 | Camp | Jan. 19, 1932 |
| 2,143,226 | Lonergan | Jan. 10, 1939 |
| 2,511,425 | Beauchamp | June 13, 1950 |
| 2,559,447 | Madland | July 3, 1951 |